United States Patent [19]

Watanabe et al.

[11] 4,152,957
[45] May 8, 1979

[54] AUTOMATIC TRANSMISSION WITH AN OVERDRIVE MEANS

[75] Inventors: Kazuaki Watanabe; Koujiro Kuramochi; Kiyoshi Ohnuma, all of Toyota, Japan

[73] Assignee: Toyota Jidosha Kogyo Kabushiki Kaisha, Japan

[21] Appl. No.: 791,576

[22] Filed: Apr. 27, 1977

[30] Foreign Application Priority Data

Dec. 1, 1976 [JP] Japan ................................ 51-144926

[51] Int. Cl.² .............................................. F16H 57/02
[52] U.S. Cl. ................................ 74/606 R; 74/781 R
[58] Field of Search ...................... 74/606, 781 R, 740

[56] References Cited

U.S. PATENT DOCUMENTS

| | | | |
|---|---|---|---|
| 3,053,115 | 9/1962 | Cartwright et al. | 74/606 |
| 3,424,034 | 1/1969 | Wickman | 74/781 R |
| 4,043,223 | 8/1977 | Ohnuma et al. | 74/881 R |
| 4,043,225 | 8/1977 | Momose | 74/740 |

*Primary Examiner*—Benjamin W. Wyche
*Assistant Examiner*—James Yates
*Attorney, Agent, or Firm*—Stevens, Davis, Miller & Mosher

[57] ABSTRACT

An automatic transmission including a fluid torque converter, an overdrive means and an auxiliary gear means, the overdrive means having a housing which presents a cylindrical outer peripheral surface concentric with the central axis of the transmission, the fluid torque converter and the auxiliary gear means having individual housings having a rear end portion and a front end portion, respectively, and presenting a cylindrical inner peripheral surface of substantially the same diameter as the aforementioned cylindrical outer peripheral surface and concentric with the central axis of the transmission whereby the transmission is assembled by engaging the aforementioned front and rear end portions over the overdrive housing.

10 Claims, 1 Drawing Figure

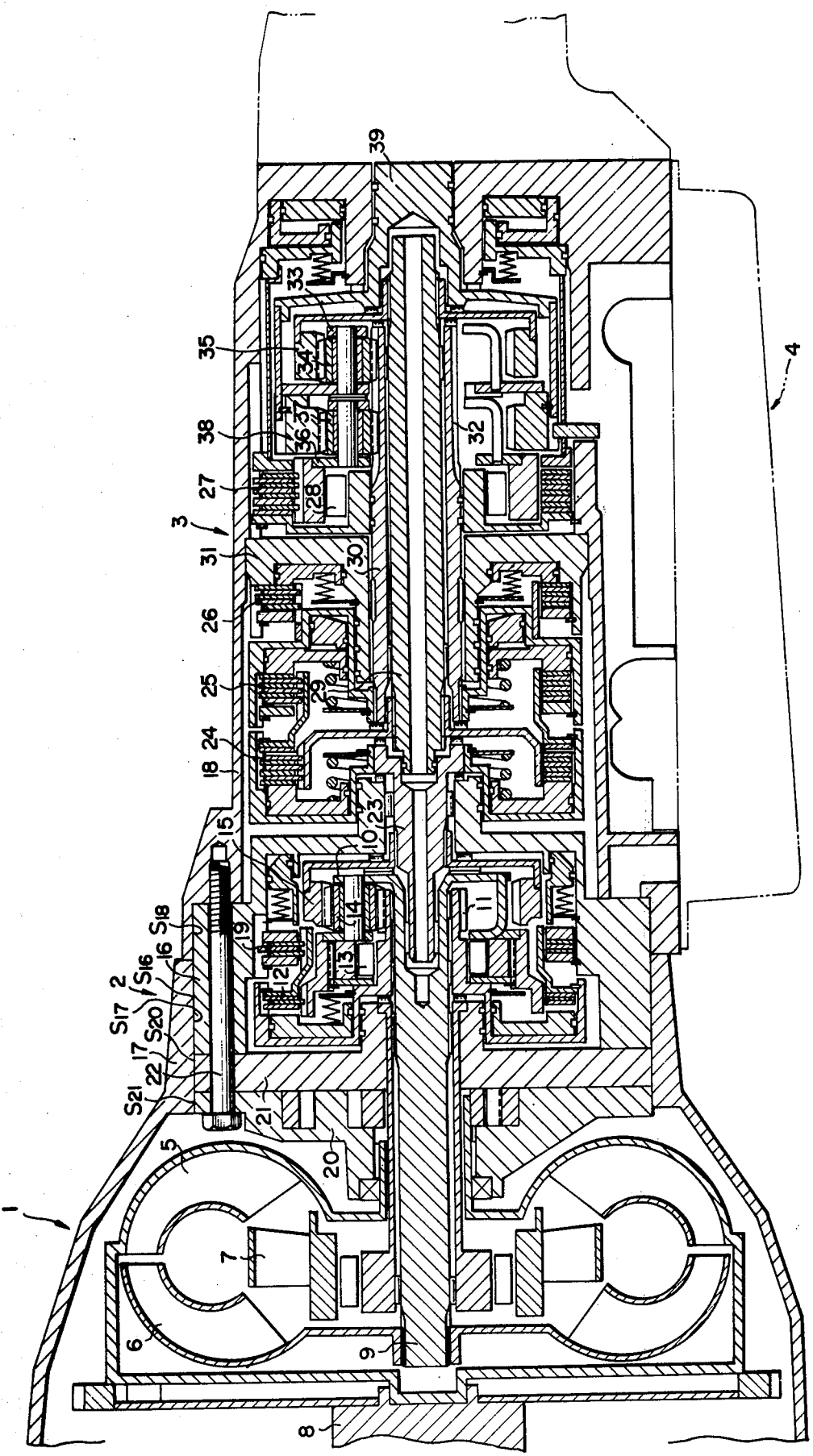

AUTOMATIC TRANSMISSION WITH AN OVERDRIVE MEANS

BACKGROUND OF THE INVENTION

1. Field of the Invention

The present invention relates to an automatic transmission for automobiles and, more particularly, an improvement with regard to the convenience for assembly of an automatic transmission of the type which comprises a fluid torque converter, an overdrive means and an auxiliary reduction gear means.

2. Description of the Prior Art

An automatic transmission for automobiles generally comprises a combination of a fluid torque converter and an auxiliary reduction gear means which effects various reduction gear ratios wherein the top gear is a direct connection. Particularly when an automatic transmission incorporates an overdrive means for effecting an overdrive gear ratio, the overdrive means is generally attached to the output side of the auxiliary reduction gear means because this arrangement requires only a slight and easy modification in the design of the standard automatic transmission including a fluid torque converter and an auxiliary gear means. However, when the overdrive means is incorporated in the rear output end portion of the transmission, it receives an input power in a higher torque condition effected by the auxiliary reduction gear means, whereby the overdrive means must be designed to have stronger and heavier gears, friction engaging means and other associated elements. This is a disadvantage in view of the dimensions and costs. Furthermore, although the design alteration in the automatic transmission itself may be small, such an enlarged transmission often requires a large modification in the design of the vehicle body.

In view of the above-mentioned disadvantages, it has been contemplated to incorporate an overdrive means between a fluid torque converter and an auxiliary reduction gear means, i.e. at the input side of a reduction gear means. However, this arrangement requires a great deal of design alteration with regard to the conventional part, and particularly it has been considered difficult to accomplish a fine alignment in the assembly of a torque converter housing enclosing the fluid torque converter, a transmission case enclosing the auxiliary gear means and a newly interposed overdrive case enclosing the overdrive means.

SUMMARY OF THE INVENTION

It is therefore the object of the present invention to deal with the aforementioned problems with regard to the matter of incorporating an overdrive means in an usual automatic transmission including a fluid torque converter and an auxiliary reduction means and to provide an improved automatic transmission with an overdrive means.

In accordance with the present invention, the above-mentioned object is accomplished by an automatic transmission comprising a fluid torque converter, an overdrive means and an auxiliary reduction gear means, said overdrive means having a housing which presents a cylindrical outer peripheral surface concentric with the central axis of said transmission, said torque converter and said auxiliary gear means having individual housings including a rear and a front end connecting portion, respectively, said connecting portions each presenting a cylindrical inner peripheral surface concentric with the central axis of said transmission and engaged over said cylindrical outer peripheral surface of said overdrive means, wherein said fluid torque converter, said overdrive means and said auxiliary gear means are assembled together to provide said transmission with a self-aligning effect when said rear and front end connecting portions are engaged over the housing of said overdrive means.

By this arrangement, the fluid torque converter, the overdrive means and the auxiliary gear means are easily assembled together depending upon a telescoping engagement which follows a cylindrical surface while said engagement automatically accomplishes the alignment of said three mechanical means. In the assembly thus obtained, the housing of the overdrive means operates not only as a means for enclosing an overdrive mechanism which generally comprises a planetary gear mechanism but also a connecting means for co-axially connecting the rear end portion of the fluid torque converter housing and the front end portion of the auxiliary gear housing. This accomplishes a simple but strict co-axial connecting engagement of said three housings in a manner of automatically effecting an aligning process. A fluid torque converter generally comprises an output shaft extending rearward and concentric around its central axis, while an auxiliary reduction gear means generally comprises an input shaft extending forward along its central axis. Similarly, an overdrive means generally comprises input and output shafts extending forward and rearward along its central axis, respectively. Therefore, in connection with the aforementioned engagement of the individual housings, it is to be effected that the output shaft of the fluid torque converter is connected with the adjacent and aligned input shaft of the overdrive means and that the input shaft of the auxiliary gear means is connected with the adjacent and aligned output shaft of the overdrive means. These connections of adjacent and aligned shaft means will not require any substantial design alteration with regard to the individual shaft means.

An automatic transmission having a fluid torque converter generally includes an oil pump incorporated therein in a manner of being directly connected with and driven by the pump impeller of the fluid torque converter. When such an oil pump is also incorporated in the automatic transmission with an overdrive means of the present invention, it is proposed as a modification of the present invention that the oil pump is provided with a housing which presents a cylindrical outer peripheral surface of the same diameter as the cylindrical outer peripheral surface of said overdrive means and concentric with the central axis of the transmission and that the oil pump having such a housing is inserted into the rear end connecting portion of the torque converter housing in an axial juxtaposition with the overdrive means. By this arrangement, an automatic transmission assembly comprising a fluid torque converter, an oil pump, an overdrive means and an auxiliary gear means is obtained in a simple structure which has a self-aligning feature automatically effected in a simple assembling process.

BRIEF DESCRIPTION OF THE DRAWING

The attached drawing is a longditudinal sectional view of an embodiment of the automatic transmission with an overdrive means according to the present invention.

DESCRIPTION OF THE PREFERRED EMBODIMENT

The present invention will now be described in more detail with regard to a preferred embodiment thereof with reference to the accompanying drawing.

Referring to the drawing, the automatic transmission herein shown comprises a fluid torque converter 1, an overdrive means 2, an auxiliary reduction gear means 3 for effecting three forward speed stages and one rearward speed stage and an oil pressure control means 4. The fluid torque converter 1 is of a conventional well-known type including a pump impeller 5, a turbine 6 and a stator 7. The pump impeller 5 is connected with the crank shaft 8 of the engine (not shown) while the turbine 6 is connected with turbine shaft 9 which forms an output shaft of the fluid torque converter. This output shaft also provides an input shaft of the overdrive means 2, wherein the input shaft is connected with a carrier 10 of a planetary gear mechanism incorporated in the overdrive means. The carrier 10 rotatably supports a plurality of planetary pinions 14 which in turn are engaged with a sun gear 11 and a ring gear 15. A multi-disc clutch 12 and a one-way clutch 13 are provided between the sun gear 11 and the carrier 10 and, furthermore, a multi-disc brake 19 is provided between the sun gear 11 and an overdrive housing or case 16 enclosing the overdrive means or the planetary gear mechanisms. The fluid torque converter 1 has a housing 17 which encloses therein the pump impeller 5, the turbine 6 and the stator 7. The auxiliary gear means 3 has a housing or transmission case 18 which encloses therein planetary gear mechanisms, clutches and brakes such as mentioned below. These housings 17 and 18 are joined together by connecting bolt means not shown in the figure. An oil pump is incorporated in a pump body formed by housing means 20 and 21. The overdrive case 16 and the oil pump housing 20, 21 are fastened to the transmission case 18 by bolts 22, one of which is shown in the figure.

In assembling the transmission, the overdrive case 16 and the oil pump body means 20, 21 are first fastened to the transmission case 18 by the bolts 22 and then the torque converter housing 17 is assembled thereon and joined with the transmission case 18 by the aforementioned bolt means (not shown). As shown in the figure, the overdrive case 16 is formed to present a cylindrical outer peripheral surface $S_{16}$ concentric with the central axis of the transmission. Similarly, the oil pump body means 20, 21 are formed to present cylindrical outer peripheral surfaces $S_{20}$ and $S_{21}$ of the same diameter as the cylindrical outer peripheral surface $S_{16}$ of the overdrive case 16 and concentric with the central axis of the transmission. On the other hand, a rear end portion of the torque converter housing 17 is formed with a bore presenting a cylindrical inner peripheral surface $S_{17}$ of substantially the same diameter as the cylindrical outer peripheral surfaces $S_{16}$, $S_{20}$ and $S_{21}$ of the overdrive case and the oil pump body means and concentric with the central axis of the transmission, said rear end portion being adapted to receive therein the oil pump body means and a part of the overdrive case. Similarly, a front end portion of the transmission case 18 is formed with a bore presenting a cylindrical inner peripheral surface $S_{18}$ of substantially the same diameter as the cylindrical outer peripheral surface $S_{16}$ of the overdrive case and concentric with the central axis of the transmission, said front end portion being adapted to receive another portion of the overdrive case. Therefore, when the oil pump body means 20 and 21 have been inserted into said rear end portion of the torque converter housing 17 while the overdrive case 16 has been inserted into both said rear end portion of the torque converter housing 17 and said front end portion of the transmission case 18, the torque converter 1, the overdrive means 2 and the auxiliary gear means 3 are brought into an assembled condition with a simultaneous incorporation of the oil pump therein, wherein all the means assembled together are automatically aligned along the central axis of the transmission.

The ring gear 15 of the overdrive means 2 is connected with an input shaft 23 of the auxiliary gear means 3. A multi-disc clutch 24 is provided between the input shaft 23 and an intermediate shaft 29 while a multi-disc clutch 25 is provided between the input shaft 23 and a sun gear shaft 30. A multi-disc brake 26 is provided between the sun gear shaft 30 and a support 31 fixed to the transmission case 18. The sun gear shaft 30 has a sun gear 32 integrally formed therein, said sun gear meshing with a plurality of first planetary pinions 34 (only one is shown) which mesh in turn with a ring gear 35 supported by a carrier 33 thereby forming a first set of planetary gear mechanisms, while the sun gear 32 also meshes with a plurality of second planetary pinions 37 (one is shown) which mesh in turn with a ring gear 38 supported by a carrier 36, thereby forming a second set of planetary gear mechanism. The ring gear 35 of said first planetary gear mechanism is connected with the intermediate shaft 29, while the carrier 33 thereof is connected with the ring gear 38 of said second planetary gear mechanism. The combination of the carrier 33 and the ring gear 38 is connected with an output shaft 39. A multi-disc brake 27 and a one-way clutch 28 are provided between the carrier 36 of said second planetary gear mechanism and the transmission case 18.

The oil pressure control means 4 positioned below the auxiliary gear means 3 includes various change-over valve means (not shown) and is adapted to control the supply of oil pressure to the aforementioned clutches and brakes in order to accomplish various shift conditions among four forward speed stages including an overdrive stage and one rearward drive stage in accordance with the operation of a manual shift valve (not shown) and/or the balance between the engine output shaft and the vehicle speed.

Table 1 shows the operating conditions of the clutches and brakes in various shift conditions.

TABLE 1

| | Eric, Enga. Means Shift Positions* | | CL 12 | CL 24 | CL 25 | BR 19 | BR 26 | BR 27 | ONE-WAY CL 28 | ONE-WAY CL 13 |
|---|---|---|---|---|---|---|---|---|---|---|
| | Parking | | 0 | X | X | X | X | 0 | — | — |
| | Reverse | | 0 | X | 0 | X | X | O | Lock | Lock |
| | Neutral | | 0 | X | X | X | X | X | — | — |
| FORWARD | D RANGE | 1st | 0 | 0 | X | X | X | X | Lock | Lock |
| WARD | RANGE | 2nd | 0 | 0 | X | X | 0 | X | Lock | Over Run |

TABLE 1-continued

| | | | | | | | | | | |
|---|---|---|---|---|---|---|---|---|---|---|
| | | 3rd | 0 | 0 | 0 | X | X | X | Lock | Over Run |
| | | O.D. | X | 0 | 0 | 0 | X | X | Over run | Over Run |
| | 2 | | | | | | | | | |
| | | 1st | 0 | 0 | X | X | X | X | Lock | Lock |
| | RANGE | 2nd | 0 | 0 | X | X | 0 | X | Lock | Over Run |
| L | RANGE | | 0 | 0 | X | X | X | 0 | Lock | Lock |

Wherein O shows that the clutches or brakes are engaged and X shows that the clutches or brakes are disengaged.

From the foregoing it will be appreciated that in accordance with the present invention an automatic transmission comprising a fluid torque converter, an overdrive means and an auxiliary gear means is obtained with a simple housing assembly structure having a self-aligning function. When the design of a conventional automatic transmission including a fluid torque converter and an auxiliary gear means is modified to further incorporate an overdrive means therein, either the torque converter housing or the transmission case will not require any change of design. Since the overdrive case if formed as a housing having a simple cylindrical outer peripheral surface in accordance with the present invention, it only requires a very simple manufacturing work. Since the assembling or disassembling work is performed by following this cylindrical outer peripheral surface, these works are performed very easily without any difficulty of aligning the members to be assembled.

Although the invention has been shown and described with respect to a preferred embodiment thereof, it should be understood by those skilled in the art that various changes and omissions of the form and detail thereof may be made therein without departing from the scope of the invention.

We claim:

1. An automatic transmission comprising a fluid torque converter, an overdrive means and an auxiliary reduction gear means, said overdrive means having a planetary gear mechanism and a housing which circumferentially encloses said planetary gear mechanism over substantially the entire axial length thereof and which presents an axially continuous cylindrical outer peripheral surface concentric with the central axis of said transmission, said torque converter and auxiliary gear means having individual housings including a rear and front end connecting portion respectively, said rear end connecting portion of said torque converter housing presenting a cylindrical inner peripheral surface concentric with the central axis of said transmission and engaged over substantially the front half of said cylindrical outer peripheral surface of said overdrive means, said front end connecting portion of said auxiliary gear mechanism presenting a cylindrical inner peripheral surface concentric with the central axis of said transmission and engaged over substantially the rear half of said cylindrical outer peripheral surface of said overdrive means, wherein said fluid torque converter, said overdrive means and said auxiliary gear means are assembled together so that the torque convertor and auxiliary reduction gear means are self-aligning when said rear and front end connecting portions are engaged over the housing of said overdrive means.

2. The automatic transmission of claim 1, wherein said rear end connecting portion of said torque converter housing and said front end connecting portion of said auxiliary gear means housing are abutted to and joined with each other to completely enclose said overdrive housing therein.

3. The automatic transmission of claim 1, wherein said front end connecting portion of said auxiliary gear housing is formed to provide a counter bore which presents said cylindrical inner peripheral surface and an annular shoulder surface for axially receiving a corresponding axial end portion of the overdrive housing.

4. The automatic transmission of claim 3, wherein said overdrive housing is fastened to said front end connecting portion of said auxiliary gear housing by bolts which traverse the entire axial length of said overdrive housing and the joining axial end faces of said overdrive housing and said front end connecting portion of said auxiliary gear housing and are screwed into said front end connecting portion.

5. The automatic transmission of claim 1, wherein said fluid torque converter comprises an input shaft, a pump impeller connected with said input shaft, a turbine, a stator and an output shaft connected with said turbine and said overdrive means comprises an input shaft, a sun gear rotatably mounted on said input shaft, a plurality of planetary pinions meshing with said sun gear, a carrier supporting said planetary pinions and connected with said input shaft, a ring gear meshing with said planetary pinions, an output shaft means supporting said ring gear and having a tubular shaft means, a clutch provided between said sun gear and said carrier and a brake provided between said sun gear and said overdrive housing, wherein said output shaft of said fluid torque converter is formed as an integral element with said input shaft of said overdrive means.

6. The automatic transmission of claim 5, wherein said auxiliary gear means comprises an output shaft having a front end portion which is inserted into and is engaged with said tubular output shaft means or said overdrive means.

7. The automatic transmission of claim 6, wherein said front end portion of said input shaft of said auxiliary gear means is rotatably supported by a rear end portion of said overdrive housing, said front end portion of said input shaft of said auxiliary gear means further having a forward extension which is rotatably engaged into a corresponding bore formed in said integral shaft element forming the input shaft of said overdrive means.

8. The automatic transmission of claim 1, further comprising an oil pump having a housing which presents a cylindrical outer peripheral surface of the same diameter as the outer peripheral surface of said overdrive means and concentric with the central axis of said transmission, said oil pump housing being received in said rear end connecting portion of said torque converter housing in an axial juxtaposition with said overdrive means.

9. The automatic transmission of claim 8, wherein said oil pump housing and said overdrive housing are both fastened to said auxiliary gear housing by bolts extending parallel to the central axis of said transmission.

10. The automatic transmission of claim 8, wherein said oil pump housing is composed of two disc elements laid one over the other in the axial direction.

* * * * *